Patented June 22, 1954

2,681,911

UNITED STATES PATENT OFFICE 2,681,911

1,2,3,4 - TETRAHYDROISOQUINOLINALKANOL ESTERS OF AROMATICALLY SUBSTITUTED ALIPHATIC ACIDS AND THEIR DERIVATIVES

John W. Cusic, Skokie, Ill., assignor to G. D. Searle & Co., Chicago, Ill., a corporation of Illinois No Drawing. Application October 6, 1951, Serial No. 250,209

13 Claims. (Cl. 260—287)

The present invention is concerned with a new group of heterocyclic organic esters and, more particularly, with derivatives of 1,2,3,4-tetrahydroisoquinoline and their salts, which are substituted in the 2-position by a radical of the structural formula

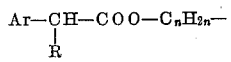

wherein Ar is an aryl, aralkyl, or aryloxy radical; R is an aryl, alkyl, or hydrogen radical; and $n$ is an integer between 1 and 6 inclusive.

In the foregoing structural formula Ar can represent such lower aromatic hydrocarbon radicals, containing preferably 6 to 15 carbon atoms, as phenyl, tolyl, xylyl, naphthyl, methylnaphthyl, dimethylnaphthyl, fluorenyl, and the like; lower aralkyl radicals such as benzyl, α-phenethyl, β-phenethyl, phenylpropyl, phenylbutyl, tolylmethyl, naphthylethyl, and the like; and aryloxy radicals such as phenoxy, toloxy and related radicals.

The radical R can be hydrogen or a lower aromatic hydrocarbon radical of the type indicated above or a lower alkyl radical such as methyl, ethyl, straight-chained and branch-chained propyl, butyl, pentyl, and hexyl.

In the foregoing structural formula, the radical —$C_nH_{2n}$— is derived from such straight-chained or branch-chained hydrocarbon radicals as methylene, ethylene, propylene, butylene, amylene, hexylene or polymethylene radicals such as trimethylene, tetramethylene, pentamethylene, and hexamethylene.

The organic bases described herein form salts with a variety of inorganic and strong organic acids, including sulfuric, phosphoric, hydrochloric, hydrobromic, hydriodic, sulfamic, citric, lactic, maleic, malic, succinic, tartaric, cinnamic, acetic, benzoic, gluconic, oxalic, ascorbic, and related acids. They also form quaternary ammonium salts with a variety of organic esters of sulfuric, hydrohalic and aromatic sulfonic acids. Among such esters are methyl chloride, bromide and iodide; ethyl chloride, propyl chloride, butyl bromide, isobutyl chloride, benzyl chloride, phenethyl chloride, naphthylmethyl chloride, dimethyl sulfate, methyl benzenesulfonate, ethyl toluenesulfonate, ethylene chlorohydrin, propylene chlorohydrin, allyl chloride, methallyl bromide and crotyl bromide.

The esters which constitute the present invention are valuable as intermediates in organic synthesis. The acid addition salts are of value as medicinal agents because of their effect on the circulatory and renal systems. The quaternary salts are active as spasmolytics and as inhibitors of autonomic nervous functions. Certain of the salts are active ingredients in parasiticidal compositions of matter.

My invention is disclosed in further detail by the following examples which are set forth for the purpose of illustration but are in no way to be construed as limiting it in spirit or in scope. In each of these examples quantities of materials are expressed in parts by weight, temperatures as degrees centigrade (° C.), and pressures during vacuum distillation as millimeters (mm.) of mercury.

EXAMPLE 1

*1,2,3,4-tetrahydroisoquinoline-2-ethanol phenylacetate hydrochloride*

Upon treatment of 240 parts of 1,2,3,4-tetrahydroisoquinoline-2-ethanol with a solution of 210 parts of phenylacetyl chloride in 2600 parts of benzene, a precipitate forms. The reaction is completed by heating at reflux temperature for 3 hours after which the solid precipitate is collected on a filter and recrystallized from alcohol. The hydrochloride of 1,2,3,4-tetrahydroisoquinoline-2-ethanol phenylacetate thus obtained melts at about 189–190° C., and has the structural formula

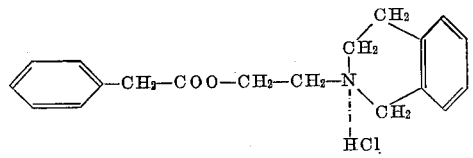

EXAMPLE 2

*3-methyl-1,2,3,4-tetrahydroisoquinoline -2- ethanol phenylacetate*

A mixture of 154 parts of phenylacetyl chloride and 191 parts of 3-methyl-1,2,3,4-tetrahydroisoquinoline-2-ethanol in 2600 parts of benzene is heated at reflux temperature for 3 hours, cooled and extracted with dilute hydrochloric acid. The aqueous extract is washed with ether, rendered alkaline by addition of sodium hydroxide, and extracted with ether. This ether extract is dried over anhydrous potassium carbonate, filtered, evaporated, and distilled at 195–200° C. and 1.5 mm. pressure. The 3-methyl-1,2,3,4-tetrahydroisoquinoline-2-ethanol phenyl acetate has the structural formula

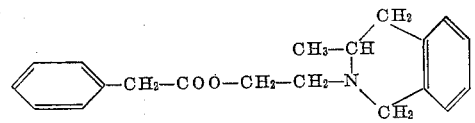

EXAMPLE 3

*1,2,3,4-tetrahydroisoquinoline-2-ethanol diphenylacetate hydrochloride*

A mixture of 480 parts of β-chloroethyl diphenylacetate and 420 parts of 1,2,3,4-tetrahydroisoquinoline in 1800 parts of toluene is heated at reflux temperature for 36 hours. A precipitate begins to form within a few minutes. After cooling the precipitated salt is collected on a filter and washed well with benzene. The solvent is evaporated under vacuum and the residue of the filtrate dissolved in dry ether, stirred with decolorizing charcoal and precipitated with an excess of alcoholic hydrogen chloride. The hydrochloride of 1,2,3,4-tetrahydroisoquinoline-2-ethanol diphenylacetate solidifies within a short time. Recrystallized from ethanol using charcoal as a clarifying agent, it melts at about 169–170° C.

EXAMPLE 4

*1,2,3,4-tetrahydroisoquinoline-2-ethanol diphenylacetate methiodide and methochloride*

An aqueous solution of the hydrochloride of 1,2,3,4-tetrahydroisoquinoline-2-ethanol diphenylacetate is rendered alkaline and extracted with ether. The ether extract is washed with water and dried over anhydrous sodium sulfate, filtered and treated with an excess of methyl iodide. Upon standing for several days a yellow, fluffy precipitate is formed which is very insoluble in water.

70 parts of 1,2,3,4-tetrahydroisoquinoline-2-ethanol diphenylacetate methiodide are stirred at room temperature with 5000 parts of water, 1600 parts of ethanol, and 100 parts of silver chloride for 50 hours, filtered and evaporated. The methochloride of 1,2,3,4-tetrahydroisoquinoline-2-ethanol diphenylacetate is thus obtained as an oil which has the structural formula

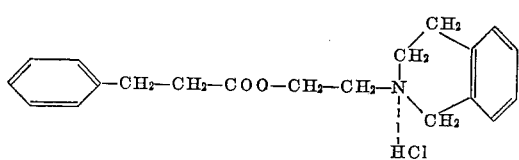

EXAMPLE 5

*1,2,3,4-tetrahydroisoquinoline-2-ethanol β-phenylpropionate hydrochloride*

A mixture of 168 parts of β-phenylpropionyl chloride and 177 parts of 1,2,3,4-tetrahydroisoquinoline-2-ethanol in 2500 parts of benzene is heated at reflux temperature for 3 hours and cooled. The resulting precipitate is collected on a filter and recrystallized from isopropanol. The hydrochloride of 1,2,3,4-tetrahydroisoquinoline-2-ethanol β-phenylpropionate thus obtained melts at about 142–143° C.

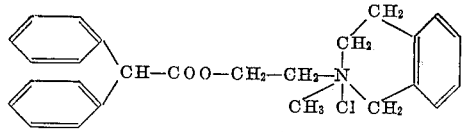

EXAMPLE 6

*δ-anhalonine-2-butanol α-phenylbutyrate*

199 parts of the δ-bromobutyl ester of α-phenylbutyric acid are added to a toluene solution of 442 parts of anhalonine and heated with stirring at reflux temperature for 30 hours. After cooling and addition of ether, the reaction mixture is filtered and the filtrate is extracted with dilute hydrochloric acid. The aqueous extract is washed with ether, rendered alkaline and then extracted with ether. This ether extract is dried over anhydrous potassium carbonate, stirred with decolorizing charcoal, filtered and evaporated to yield a clear, high boiling, orange oil. The δ-anhalonine-2-butanol α-phenylbutyrate thus obtained has the structural formula

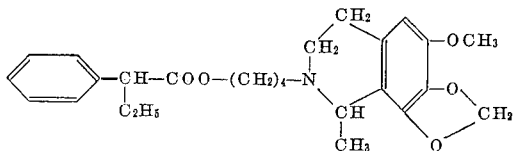

EXAMPLE 7

*1-phenyl-3-methyl-1,2,3,4-tetrahydroisoquinoline-2-ethanol p-methylphenylacetate*

A mixture of 168 parts of p-methylbenzoyl chloride and 281 parts of 1-phenyl-3-methyl-1,2,3,4-tetrahydroisoquinoline-2-ethanol in 3000 parts of toluene is heated at reflux temperature for 5 hours and then concentrated and cooled. The resulting precipitate is collected on a filter, dissolved in water, washed with ether, rendered alkaline by addition of dilute sodium hydroxide and extracted with ether. This ether extract is dried over anhydrous calcium sulfate, stirred with decolorizing charcoal, filtered and evaporated to yield the 1-phenyl-3-methyl-1,2,3,4-tetrahydroisoquinoline-2-ethanol p-methylphenylacetate as a clear, high boiling, amber oil which has the structural formula

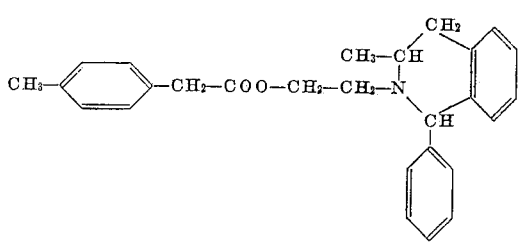

EXAMPLE 8

*1,2,3,4-tetrahydroisoquinoline - 2 - ethanol phenoxyacetate hydrochloride*

A mixture of 170 parts of phenoxyacetyl chloride and 177 parts of 1,2,3,4-tetrahydroisoquinoline-2-ethanol in 2500 parts of benzene is heated at reflux temperature for 2 hours. The precipitated hydrochloride of the phenoxyacetate of 1,2,3,4-tetrahydroisoquinoline-2-ethanol is collected on a filter. Recrystallized from dilute isopropanol, it melts at about 176–177° C. The salt has the structural formula

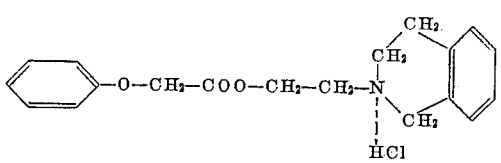

EXAMPLE 9

*1,2,3,4-tetrahydroisoquinoline-2-ethanol α-phenoxypropionate*

184 parts of α-phenoxpropionyl chloride and 177 parts of 1,2,3,4-tetrahydroisoquinoline-2-ethanol in 2500 parts of benzene are heated at reflux temperature for 2 hours. After cooling the precipitate is collected on a filter and recrystallized from dilute isopropanol. The hydrochloride of 1,2,3,4-tetrahydroisoquinoline-2-ethanol α-phenoxypropionate thus obtained melts at about 185–186° C. and has the structural formula

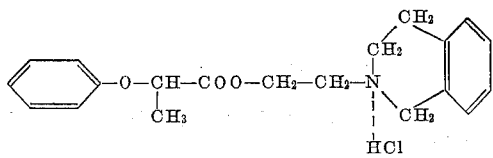

EXAMPLE 10

α,α - Dimethyl - 1,2,3,4-tetrahydroisoquinoline-2-methanol di-α-naphthylacetate A mixture of 21 parts of di-α-naphthylacetyl chloride and 13 parts of α,α-dimethyl-1,2,3,4-tetrahydroisoquinoline-2-methanol in 300 parts of xylene is heated at reflux temperature for 6 hours and then concentrated and chilled. The precipitated hydrochloride is collected on a filter, dissolved in water, washed with ether, treated with an excess of dilute ammonium hydroxide, and extracted with ether. The ether extract is dried over anhydrous calcium sulfate, filtered and evaporated to yield the α,α-dimethyl-1,2,3,4-tetrahydroisoquinoline-2-methanol di - α - naphthylacetate as a clear, high boiling orange oil. It has the structural formula

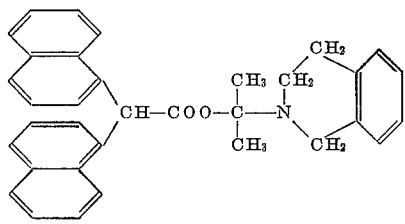

I claim:
1. A member of the class consisting of the esters of the structural formula

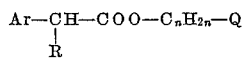

and salts thereof, wherein Ar is a member of the class consisting of aromatic hydrocarbon radicals containing 6–15 carbon atoms, lower aralkyl radicals containing 6 to 15 carbon atoms and phenoxy radicals, R is a member of the class consisting of lower aromatic hydrocarbon radicals containing 6 to 15 carbon atoms, lower alkyl and hydrogen radicals, $n$ is an integer between 1 and 6, inclusive, and Q is a member of the class consisting of the 2-(1,2,3,4-tetrahydro)isoquinolyl radical and 2 - (1,2,3,4 - tetrahydro)isoquinolyl radicals substituted in the nitrogen-containing ring by members of the class consisting of methyl and unsubstituted phenyl radicals.

2. A 1,2,3,4-tetrahydroisoquinoline - 2 - alkanol arylacetate of the structural formula

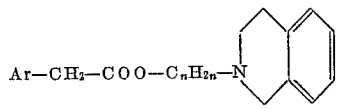

wherein Ar is an aromatic hydrocarbon radical containing 6 to 15 carbon atoms, and $n$ is an integer between 1 and 6, inclusive.

3. A 1,2,3,4-tetrahydroisoquinoline - 2 - alkanol phenylacetate of the structural formula

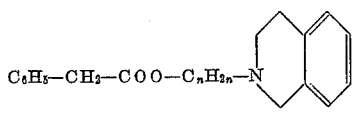

wherein $n$ is an integer between 1 and 6, inclusive.

4. A 1,2,3,4-tetrahydroisoquinoline - 2 - alkanol arylalkanoate of the structural formula

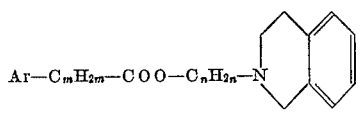

wherein Ar is an aromatic hydrocarbon radical containing 6 to 15 carbon atoms, $m$ is an integer between 2 and 6, inclusive, and $n$ is an integer between 1 and 6, inclusive.

5. A 1,2,3,4-tetrahydroisoquinoline - 2 - alkanol phenylalkanoate of the structural formula

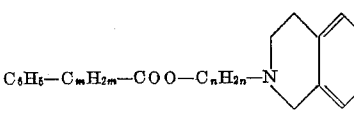

wherein $m$ is an integer between 2 and 6, inclusive, and $n$ is an integer between 1 and 6, inclusive.

6. A 1,2,3,4-tetrahydroisoquinoline - 2 - alkanol β-phenylpropionate of the structural formula

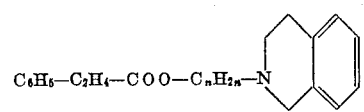

wherein $n$ is an integer between 1 and 6, inclusive.

7. A Py-alkyl-1,2,3,4-tetrahydroisoquinoline-2-alkanol arylalkanoate of the structural formula

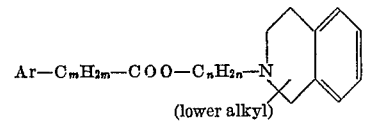

wherein Ar is an aromatic hydrocarbon radical containing 6 to 15 carbon atoms and $m$ and $n$ are integers between 1 and 6, inclusive.

8. A Py-alkyl-1,2,3,4 - tetrahydroisoquinoline-2-alkanol phenylalkanoate of the structural formula

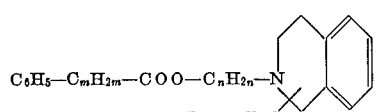

wherein $m$ and $n$ are integers between 1 and 6, inclusive.

9. A Py-methyl-1,2,3,4-tetrahydroisoquinoline-2-alkanol phenylalkanoate of the structural formula

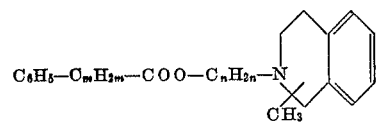

wherein $m$ and $n$ are integers between 1 and 6, inclusive.

10. A Py-methyl - 1,2,3,4 - tetrahydroisoquinoline-2-alkanol phenylacetate of the structural formula

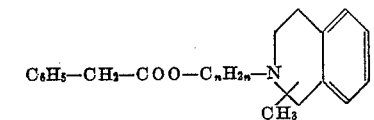

wherein $n$ is an integer between 1 and 6, inclusive.

11. A 1,2,3,4-tetrahydroisoquinoline-2-alkanol diarylacetate of the structural formula

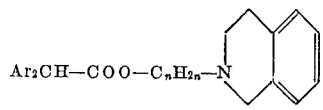

wherein Ar is an aromatic hydrocarbon radical containing 6 to 15 carbon atoms, and $n$ is an integer between 1 and 6, inclusive.

12. A 1,2,3,4-tetrahydroisoquinoline-2-alkanol diphenylacetate of the structural formula

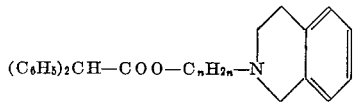

wherein $n$ is an integer between 1 and 6, inclusive.

13. A 1,2,3,4-tetrahydroisoquinoline-2-alkanol phenoxyalkanoate of the structural formula

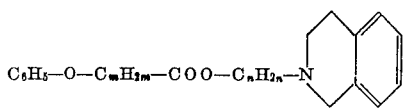

wherein $m$ and $n$ are integers between 1 and 6, inclusive.

No references cited.